United States Patent
Safford et al.

(10) Patent No.: US 12,034,649 B2
(45) Date of Patent: Jul. 9, 2024

(54) ROUTING TRAFFICS HAVING PRIMARY AND SECONDARY DESTINATIONS IN COMMUNICATION NETWORKS

(71) Applicant: Intel Corporation, Santa Clara, CA (US)

(72) Inventors: Kevin Safford, Fort Collins, CO (US); Victor Ruybalid, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 896 days.

(21) Appl. No.: 16/876,902

(22) Filed: May 18, 2020

(65) Prior Publication Data
US 2020/0280526 A1 Sep. 3, 2020

(51) Int. Cl.
| | |
|---|---|
| H04L 49/109 | (2022.01) |
| G06F 13/42 | (2006.01) |
| H04L 12/44 | (2006.01) |
| H04L 45/02 | (2022.01) |
| H04L 45/16 | (2022.01) |
| H04L 45/48 | (2022.01) |

(52) U.S. Cl.
CPC ............ *H04L 49/109* (2013.01); *G06F 13/42* (2013.01); *H04L 12/44* (2013.01); *H04L 45/02* (2013.01); *H04L 45/16* (2013.01); *H04L 45/48* (2013.01); *G06F 2213/0038* (2013.01)

(58) Field of Classification Search
None
See application file for complete search history.

(56) References Cited

U.S. PATENT DOCUMENTS

| | | | |
|---|---|---|---|
| 7,058,009 B1 | 6/2006 | Skirmont et al. | |
| 8,856,420 B2* | 10/2014 | Chandra | H04L 47/39 710/316 |
| 10,585,825 B2* | 3/2020 | Desai | G06F 9/4881 |
| 10,644,985 B1* | 5/2020 | Rathnamaiah | H04L 69/16 |
| 2012/0158995 A1 | 6/2012 | McNamee et al. | |

(Continued)

OTHER PUBLICATIONS

Extended European Search Report dated Apr. 7, 2021 for EP Application No. 20208280.6, 13 pages.
(Continued)

*Primary Examiner* — Lonnie V Sweet
(74) *Attorney, Agent, or Firm* — Schwabe, Williamson & Wyatt, P.C.

(57) ABSTRACT

Embodiments include apparatuses, methods, and systems of routing network containing a set of sources, a primary destination, a set of secondary destinations, and one or more routing elements. A routing element includes an input port, a set of output ports including a primary output port and a set of secondary output ports, and a control unit. The control unit is arranged to select a secondary output port to deliver a received message when the intended destination of the message is a secondary destination and the secondary output port is in a functional state. Otherwise, the control unit is arranged to select the primary output port to deliver the received message to the primary destination when the intended destination is the secondary destination and the secondary output port that reaches the secondary destination is in a nonfunctional state. Other embodiments may also be described and claimed.

22 Claims, 6 Drawing Sheets

(56) References Cited

U.S. PATENT DOCUMENTS

| | | | |
|---|---|---|---|
| 2015/0092792 A1* | 4/2015 | Shen | H04J 13/0003 |
| | | | 370/479 |
| 2015/0280989 A1 | 10/2015 | Raza et al. | |
| 2016/0308793 A1* | 10/2016 | Levy-Abegnoli | H04L 45/16 |
| 2018/0089122 A1* | 3/2018 | Oz | G06F 13/37 |
| 2018/0287963 A1* | 10/2018 | Cheng | H04L 49/101 |
| 2018/0336080 A1* | 11/2018 | Jain | G06F 11/36 |
| 2020/0137055 A1* | 4/2020 | Isola | H04L 63/101 |
| 2021/0303443 A1* | 9/2021 | McConnell | G06F 21/46 |

OTHER PUBLICATIONS

Intel: "Trace Hub (Intel TH) Developer's Manual", Oct. 31, 2017, XP055790159, Retrieved from the Internet: URL: https://software.intel.com/sites/default/files/intel-trace-hub-developers-manual-2.1.2.pdf, pp. 20-26, 50-55, 64-65, and 125.

* cited by examiner

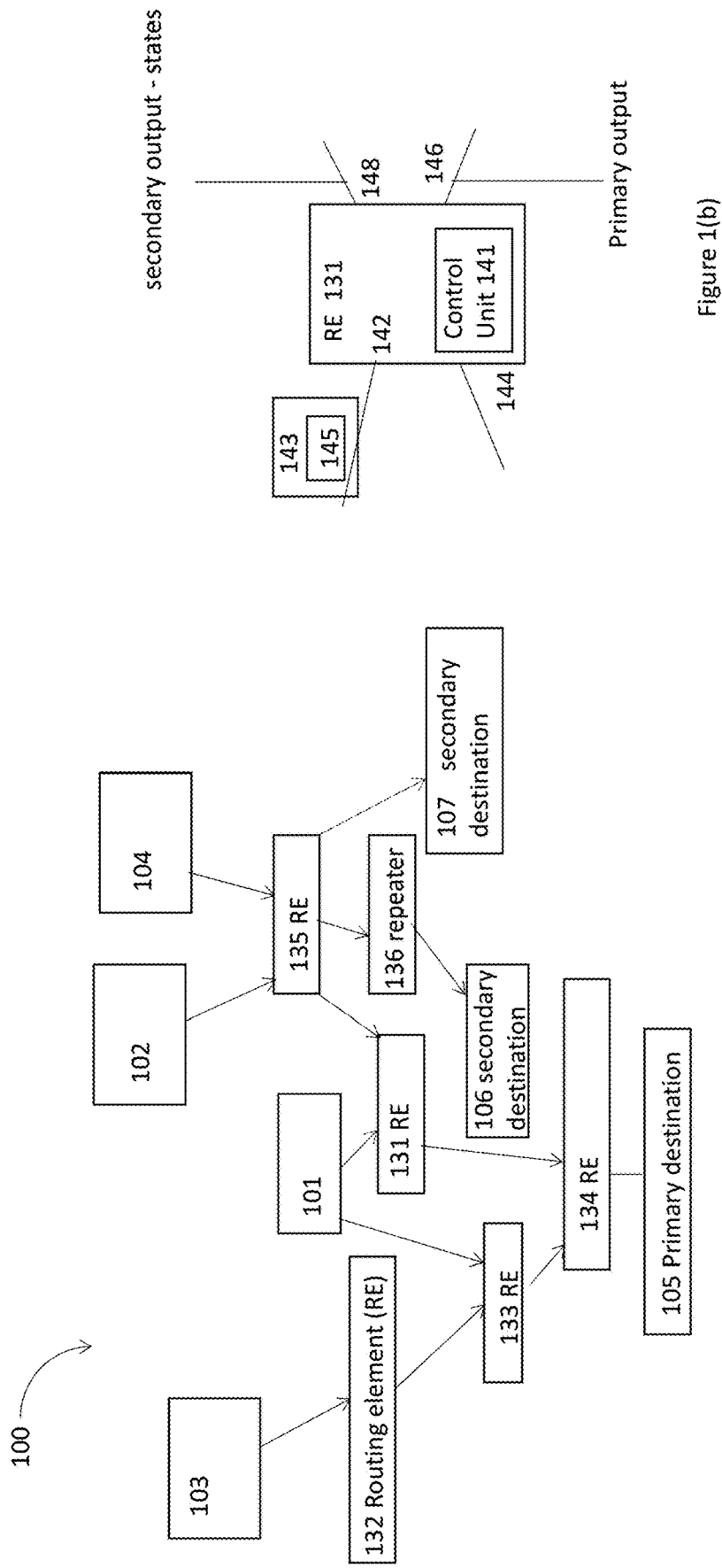

ROUTING TRAFFICS HAVING PRIMARY AND SECONDARY DESTINATIONS IN COMMUNICATION NETWORKS

FIELD

Embodiments of the present disclosure generally relate to the field of communication networks, more particularly, to routing traffics having primary and secondary destinations in communication networks.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A communication network may include multiple communication nodes interconnected together according to a topology to route traffics from sources to destinations. Routing is the process of selecting a path for a traffic in a communication network or between or across multiple networks. For example, a computer network is a digital telecommunications network for sharing resources between nodes, which are computing devices. As another example, a system on chip (SoC) is an integrated circuit (also known as a "chip") that integrates all or most components of a computer or other electronic system. Building a complex SoC faces an enormous challenge to get a reliable, high performance product to market on time. Embedded debug and trace logic built into the SoC can greatly assist this task. Often the debug and trace logic of a SoC may include a debug trace fabric (DTF) or network to route trace traffics from sources to destinations. For any communication network design, an important consideration is the available bandwidth. Some networks, e.g., a DTF in a SoC, or other networks, may face challenges for routing on the limited bandwidths.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 1(a)-1(c) schematically illustrate examples for routing traffics in a routing network having a set of routing elements, a set of sources, a primary destination, and a set of secondary destinations, according to various embodiments.

DETAILED DESCRIPTION

Figure 1C:
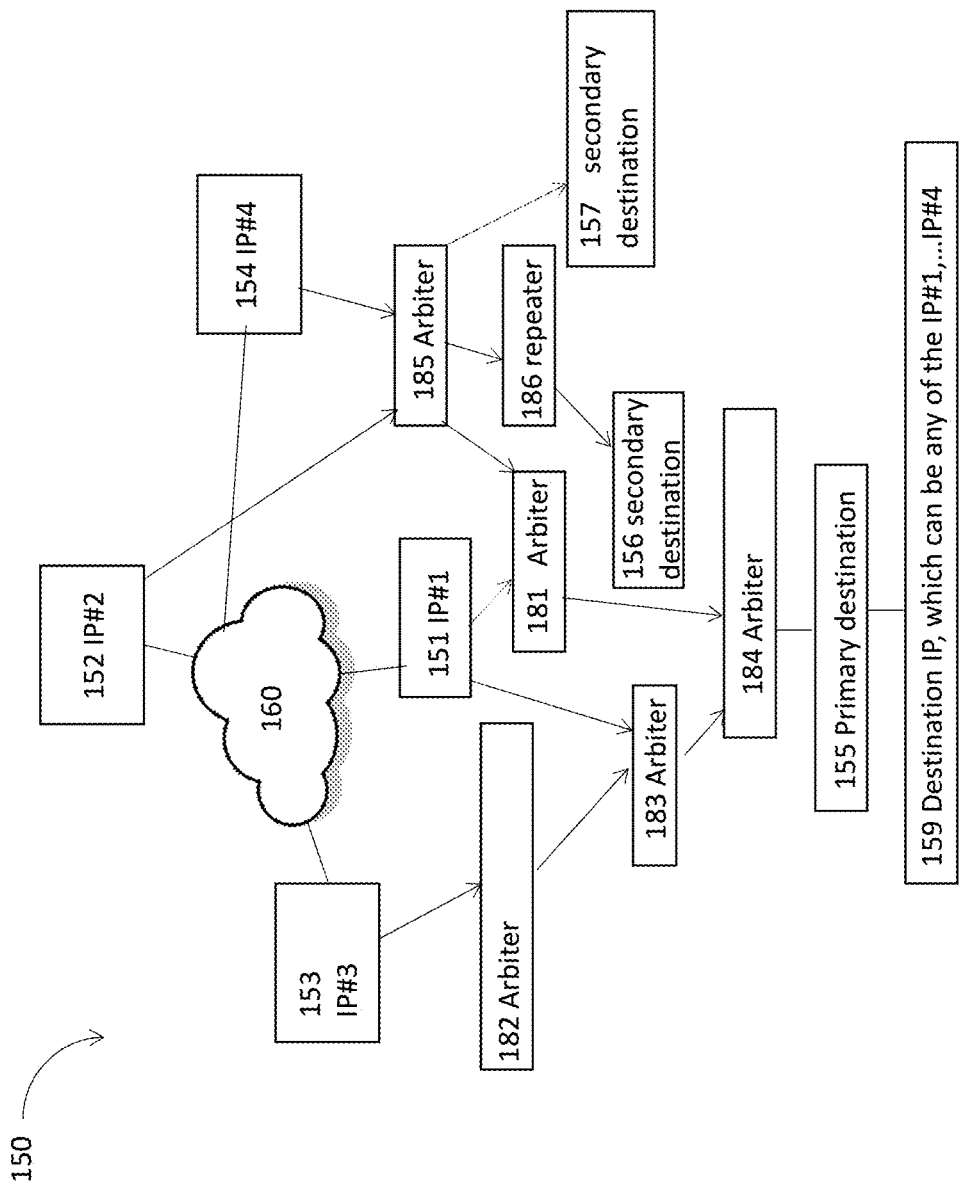

The following detailed description refers to the accompanying drawings. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

A communication network, e.g., a computer network, a debug trace fabric (DTF) for a system on chip (SoC), or other networks, may include multiple communication nodes interconnected together according to a topology to route traffics from sources to destinations. Communication nodes in a communication network may include sources, intermediate nodes or routing nodes, and destinations. A routing network may be a communication network that performs routing function of traffics. In embodiments, a traffic in a communication network may start from a source and have multiple destination nodes, e.g., a primary destination, and one or more secondary destinations. A primary destination node may be a default destination for a traffic. A traffic intended to reach a secondary destination may be routed to the intended secondary destination, or to the primary destination instead while maintaining the desired functions for the traffic. A traffic may include one or more messages or packets. A packet, a message, and a traffic may be used interchangeably in the description below.

A SoC may have an embedded debug and trace logic built into the SoC to assist the debug tasks. Often the debug and trace logic includes a DTF to route trace traffics, where the DTF is an example of a routing network. In some embodiments, a DTF may have a tree-like structure. A trace traffic may have two or more destinations. A primary destination may be a particular trace destination, e.g., memory, internal buffers, an external port, etc., which is shared among all of the trace sources within a SoC. The primary destination shared among traces may become a bottleneck for the communication within the DTF. One way to remove or reduce the bottleneck is to provide one or more additional trace aggregators on the DTF, which essentially "segment" the DTF and allow the total available bandwidth to scale up. The one or more additional trace aggregators are the secondary destinations for trace traffics. With multiple trace aggregators as the secondary destinations, the debug user can configure the DTF to send traces from individual sources to the appropriate trace destinations, e.g., trace aggregators as the secondary destination, or the primary destination.

Embodiments herein present a device to act as a first of a plurality of routing elements in a routing network. The routing network further includes a set of sources, a primary destination, and a set of secondary destinations. The device includes an input port, a set of output ports including a primary output port and a set of secondary output ports, and a control unit. The input port is arranged to receive a message from a first neighbor in the routing network, where the message includes a destination identifier to identify an intended destination selected from the primary destination or the set of secondary destinations. The primary output port is arranged to be coupled to a second neighbor that is the primary destination or a routing element that reaches the primary destination. A secondary output port is arranged to be coupled to a third neighbor that is one of the secondary destinations or a routing element that reaches one or more of the set of secondary destinations. The control unit is arranged to select a secondary output port of the set of output ports to deliver the received message when the intended destination of the message is a secondary destination of the set of secondary destinations and the secondary output port is in a functional state. Otherwise, the control unit is arranged to select the primary output port to deliver the received message to the primary destination when the intended destination is the secondary destination and the secondary output port that reaches the secondary destination is in a nonfunctional state.

Embodiments herein present a DTF for a SoC of a computer system. The SoC includes multiple functional blocks. The DTF includes a set of sources, a primary destination coupled to one or more of the multiple functional blocks, a set of secondary destinations coupled to one or more of the multiple functional blocks, and one or more arbiters. The set of sources are selected from the multiple functional blocks. An arbiter of the one or more arbiters includes an input port, a set of output ports including a primary output port and a set of secondary output ports, and a control unit. The input port is arranged to receive a message from a first neighbor in the DTF, and the message includes a destination identifier to identify an intended destination selected from the primary destination or the set of secondary destinations. The primary output port is coupled to a second neighbor, where the second neighbor is the primary destination or an arbiter that reaches the primary destination. A secondary output port is coupled to a third neighbor, where the third neighbor is a secondary destination or an arbiter that reaches the secondary destination. The control unit is arranged to select a secondary output port of the set of output ports to deliver the received message when the intended destination of the message is the secondary destination and the secondary output port is in a functional state. Alternatively, the control unit is arranged to select the primary output port to deliver the received message to the primary destination when the intended destination is the secondary destination and the secondary output port that reaches the secondary destination is in a nonfunctional state.

Embodiments herein present a method for a routing element in a routing network. The routing network further includes a set of sources, a primary destination, and a set of secondary destinations. The method includes receiving a message from a first neighbor in the routing network, and the message includes a destination identifier to identify an intended destination selected from the primary destination or the set of secondary destinations. The method further includes selecting a secondary output port from a set of secondary output ports of the routing element to deliver the received message when the intended destination is a secondary destination of the set of secondary destinations and the secondary output port is in a functional state. Alternatively, the method includes selecting a primary output port of the routing element to deliver the received message to the primary destination when the intended destination is the secondary destination and the secondary output port that reaches the secondary destination is in a nonfunctional state. The routing element includes the primary output port and the set of secondary output ports. The primary output port is arranged to be coupled to a second neighbor that is the primary destination or a routing element that reaches the primary destination. A secondary output port is arranged to be coupled to a third neighbor that is the secondary destination or a routing element that reaches one or more of the set of secondary destinations.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

FIGS. 1(a)-1(c) schematically illustrate examples for routing traffics in a routing network including a set of routing elements, a set of sources, a primary destination, and a set of secondary destinations, according to various embodiments. FIG. 1(a) illustrates a routing network 100, while FIG. 1(c) illustrates a routing network 150 in a SoC.

In embodiments, as shown in FIG. 1(a), the routing network 100 includes a set of routing elements, e.g., a routing element (RE) 131, a RE 132, a RE 133, a RE 134, a RE 135, and a RE 136. In addition, the routing network 100 includes a set of sources, e.g., a source 101, a source 102, a source 103, and a source 104, a primary destination 105, and a set of secondary destinations, e.g., a secondary destination 106, and a secondary destination 107. In some embodiments, the set of sources and the primary destination together with one or more routing elements form a tree, and a secondary destination is coupled to the tree through one or more of the routing elements. For example, the source 101, the source 102, the source 103, and the source 104, the RE 131, the RE 132, the RE 133, the RE 134, the RE 135, and the RE 136, and the primary destination 105 form a tree, where the source 101, the source 102, the source 103, and the source 104 are the leaves, and the primary destination 105 is the root. The secondary destination 106 is coupled to the tree through the RE 131, and the secondary destination 107 is coupled to the tree through the RE 135.

In embodiments, a RE receives a packet, a message, or a traffic from one or more neighbors in the routing network and may transmit the received packet, message or traffic to one or more neighbors in the routing network. A neighbor of a RE is a node, e.g., a source, a RE, the primary destination, or a secondary destination, of the routing network that is directly coupled to the RE by an edge in the graph or the tree of the routing network. For example, the RE 131 may receive a message from multiple neighbors, e.g., the source 101, the RE 135, and may transmit the message to multiple neighbors, e.g., the RE 134 and the secondary destination 106. On the other hand, the RE 136 receives only from the RE 135 and transmits only to the secondary destination 106, with only one neighbor for the input and only one neighbor for the output. The RE 136 may be referred to as a repeater, which is a special routing element.

FIG. 1(b) illustrates the RE 131 in details. The RE 131 is shown as an example, other REs may have similar details as the RE 131. The RE 131 includes an input port 142 and an input port 144, an output port 146 and an output port 148, and a control unit 141. The output port 146 may be a primary output port, and the output port 148 may be a secondary output port. The secondary output port 148 may be in various states, e.g., a state selected from a not connected state, a configuration state, a reset state, or a functional state. A nonfunctional state includes the not connected state, the configuration state, or the reset state. The input port 142 and the input port 144 may be coupled to the RE 135 or the source 101 as shown in FIG. 1(a), while the primary output port 146 is coupled to the RE 134 that reaches the primary destination 105. In some other embodiments, a primary output port may be directly coupled to the primary destination 105. The secondary output port 148 is coupled to the secondary destination 106. In some other embodiments, a secondary output port may be coupled to a RE that reaches one or more of the set of secondary destinations.

In embodiments, the RE 131 has two input ports and two output ports including the primary output port 146 and the secondary output port 148. The RE 135 has two input ports and three output ports, one output port reaching the primary destination 105, and two other output ports reaching the secondary destination 106 or the secondary destination 107, respectively. In general, a routing network may have different routing elements, where a first routing element has a first set of output ports, a second routing element has a second set of output ports, and the first set of output ports is of a first size different from a second size of the second set of output ports of the second routing element.

As shown in FIG. 1(b), the input port 142 is arranged to receive a message 143 from a neighbor in the routing network 100. The message 143 includes a destination identifier 145 to identify an intended destination for the message 143. The intended destination is selected from the primary destination 105 or the set of secondary destinations, e.g., the secondary destination 106 or the secondary destination 107. The destination identifier 145 may be of various sizes, dependent on the number of secondary destinations and other design options. In some embodiments, the routing network includes only one secondary destination, and the destination identifier includes only one bit having a binary value of 0 or 1, to indicate whether the intended destination is the primary destination or the secondary destination.

In embodiments, the control unit 141 is arranged to select the secondary output port or the primary output to deliver the received message based on the intended destination indicated by the destination identifier without information about a topology of the routing network. There may be many advantages associated with such an approach. For example, routing of the message may be achieved by limited number of bits in the destination identifier, e.g., one bit when there is only one secondary destination, without any need for further programming any of the REs in the routing network 100. Hence, the routing network 100 may be dynamically configured or changed by adding or removing REs without changing any "programming" of the routing of the messages.

In embodiments, the control unit 141 is arranged to select one of the secondary output ports to deliver the received message when the intended destination is one of the secondary destinations and the secondary output port is in a functional state. In embodiments, the control unit 141 is arranged to select the primary output port to deliver the received message to the primary destination when the intended destination is a secondary destination and the secondary output port that reaches the secondary destination is in a nonfunctional state. For example, the control unit 141 may select the secondary output port 148 to deliver the received message 143 when the intended destination is a secondary destination and the secondary output port 148 is in a functional state. However, when the secondary output port 148 is not in a functional state, e.g., in a not connected state, a configuration state, a reset state, not presented state, or disabled state, the control unit 141 may select the primary output port 146 to deliver the received message 143 to the primary destination 105 instead of the intended secondary destination, while the functionality of the message 143 is still achieved. Hence, when the secondary destination is not present or enabled, each packet will flow through to the primary destination at the root of the tree for the routing network. This property allows for a dynamic configuration, and support for products that may not have a secondary destination.

In embodiments, the control unit 141 is further arranged to select the primary output port to deliver the received message 143 to the primary destination 105 when the destination identifier 145 indicates the intended destination to be the primary destination 105.

In embodiments, the message 143 may be a first message from a first neighbor with the secondary destination as a first intended destination, and the RE 131 further receives a second message through the input port 144 from a different neighbor with the primary destination as an intended destination of the second message. The control unit 141 is arranged to select the secondary output port 148 to deliver the first received message 143, and select the primary output port 146 to deliver the second received message to the primary destination 105 in parallel with delivering the first message 143.

FIG. 1(c) illustrates the routing network 150 in a SoC, where the routing network 150 includes a set of arbiters, a set of sources, a primary destination, and a set of secondary destinations. In embodiments, the routing network 150 is a part of a DTF for a SoC, and the arbiters are routing elements.

In embodiments, as shown in FIG. 1(c), the routing network 150 includes a set of arbiters, e.g., an arbiter 181, an arbiter 182, an arbiter 183, an arbiter 184, an arbiter 185, and an arbiter 186. In addition, the routing network 150 includes a set of sources, e.g., a source 151, a source 152, a source 153, and a source 154, a primary destination 155, and a set of secondary destinations, e.g., a secondary destination 156, and a secondary destination 157. The primary destination 155 includes a buffer coupled to all functional blocks of the SOC, which is shown as the destination functional block 159. For example, the primary destination 155 may include memory, internal buffers, an external port, etc., which is shared among all of the trace sources within a SoC, while the secondary destination 156 and the secondary destination 157 may be trace aggregators.

In some embodiments, the set of sources and the primary destination together with one or more routing elements form a tree, and a secondary destination is coupled to the tree through one or more of the routing elements. For example, the source 151, the source 152, the source 153, and the source 154, the arbiter 181, the arbiter 182, the arbiter 183, the arbiter 184, the arbiter 185, and the arbiter 186, and the primary destination 155 form a tree, where the source 151, the source 152, the source 153, and the source 154 are the leaves, and the primary destination 155 is the root. The secondary destination 156 is coupled to the tree through the arbiter 181, and the secondary destination 157 is coupled to the tree through the arbiter 185.

In embodiments, the source 151, the source 152, the source 153, and the source 154 are multiple functional blocks of the SoC. A functional block of the multiple functional blocks for the SoC is selected from a processor, a memory, an input/output block, a secondary storage, an analog functional block, or a mixed-signal functional block. In general, the sources of a DTF are selected from the multiple functional blocks of the SoC. The SoC further includes a functional communication network coupling the multiple functional blocks. As shown in FIG. 1(c), the functional communication network 160 is a star network coupling the multiple functional blocks, e.g., the source 151, the source 152, the source 153, and the source 154.

Figure 2A:
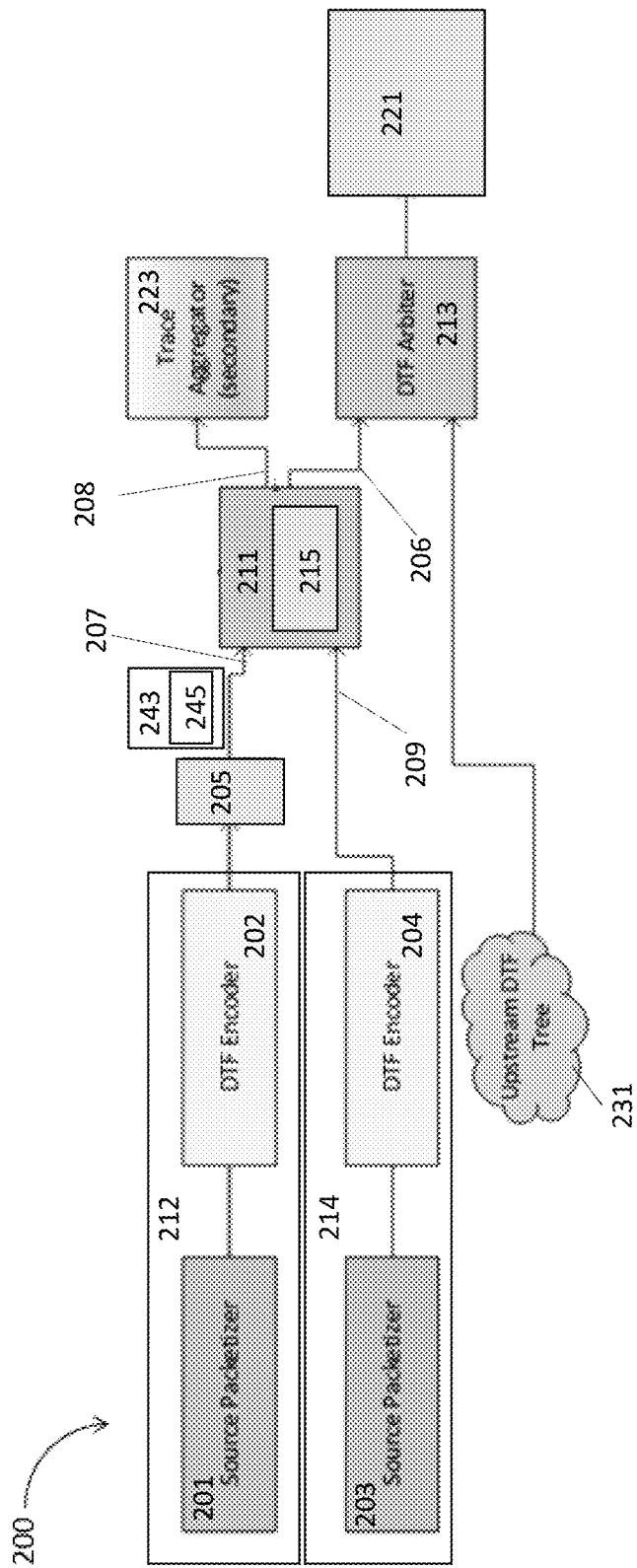
FIGS. 2(a)-2(b) schematically illustrate an example debug trace fabric (DTF) having a set of arbiters, a set of sources, a primary destination, and a secondary destination in a system on a chip (SoC), according to various embodiments.
Figure 2B:
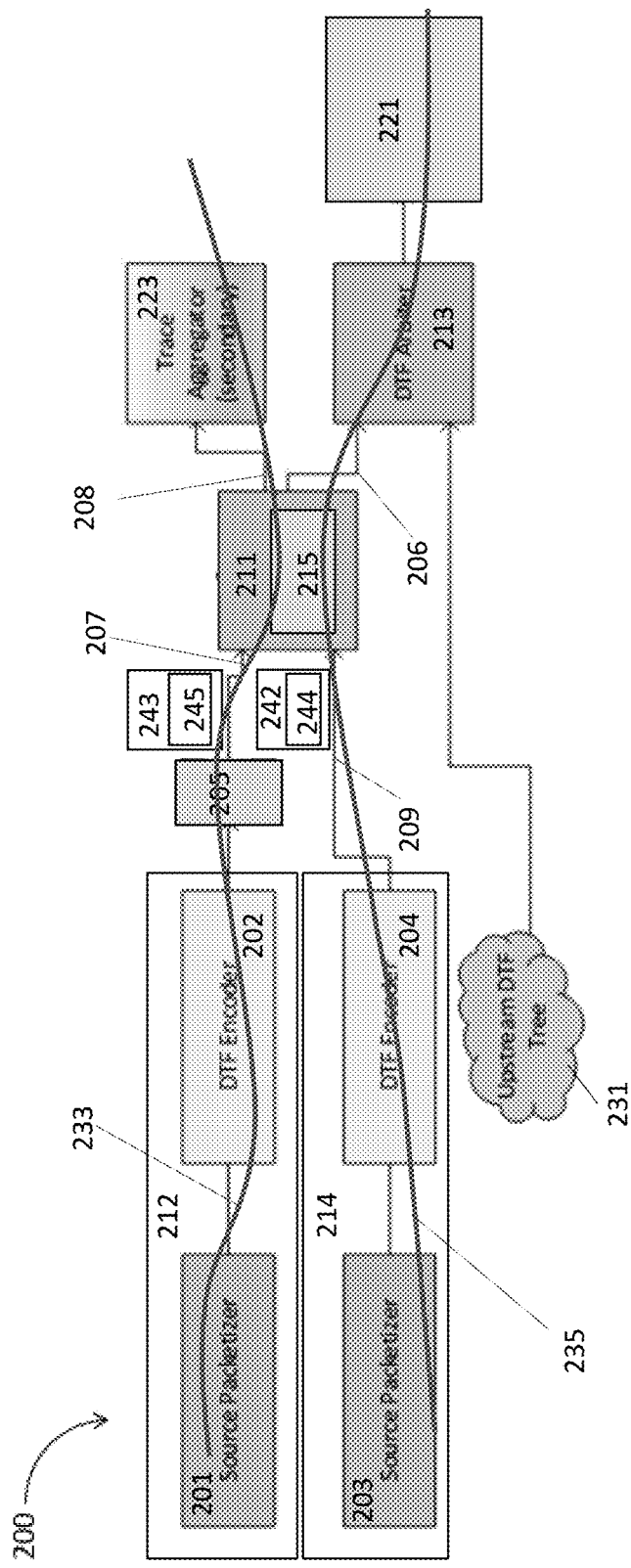

FIGS. 2(a)-2(b) schematically illustrate an example DTF 200 including a set of arbiters, a set of sources, a primary destination, and a secondary destination in a SoC, according to various embodiments. In embodiments, the DTF 200 includes a source 212, a source 214, a repeater 205, an arbiter 211, an arbiter 213, a primary destination 221, and a secondary destination 223, plus an upstream DTF tree 231. The sources and the primary destination 221 together with the one or more arbiters form a tree that includes the upstream DTF tree 231, where only a part of the tree is shown. The secondary destination 223 is coupled to the tree through the arbiter 221. The source 212 and the source 214, the primary destination 221, and the secondary destination 223 are examples of the source 151, the source 152, the source 153, the source 154, the primary destination 155, the secondary destination 156, or the secondary destination 157, respectively, as shown in FIG. 1(c).

The part shown for the DTF 200 is only for example. The overall network topology for the DTF 200 may be far more complicated, with many different sources, arbiters, and secondary destinations. In some embodiments, any arbitrary topology may be supported, provided that the topology does not implement a loop. In embodiments, the DTF 200 is a hardware tracing system built into a SoC. The DTF 200 transmits the debug trace information from a source to a destination. The DTF 200 may include three components: the physical interconnects (e.g., the wires, the widths and speeds, the communication nodes), the protocol used on interconnect (e.g., arbitration, priority schemes, crediting), and the packetization of the payloads (e.g., how the trace source data is represented). The DTF 200 is implemented within the SoC based on the tracing requirements.

In embodiments, the source 212 or the source 214 may be a functional block selected from the multiple functional blocks of the SoC. In some other embodiments, the source 212 or the source 214 may be a separated entity coupled to a functional block. The source 212 includes a source packetizer 201 and a DTF encoder 202, and the source 214 includes a source packetizer 203 and a DTF encoder 204. The source packetizer 201 or the source packetizer 203 produces the debug data to be captured. A source packetizer varies in type and design and is dependent on the type of debug data being produced. The DTF encoder 202 or the DTF encoder 204 is used to take the data produced by a source packetizer and transfer it to the backbone, e.g., a tree-based network of arbiters, of the DTF 200. A DTF encoder may implement the flow control with the fabric backbone. A source packetizer and an encoder together may be referred to as a "debug source" or a "trace source."

In embodiments, the DTF 200 is generally organized as a tree with multiple sources flowing to a single trace aggregator, e.g., the primary destination 221. The primary destination 221 may be a trace aggregator that receives the contents of the traces and sends it to its final destination functional block of the SoC. In some embodiments, the trace aggregator may receive its input from a DTF arbiter or a DTF encoder. In some embodiments, a hardware tracing system, e.g., the DTF 200, is designed to provide many different trace sources a path to the primary destination 221, e.g., memory, internal buffers, an external port, etc. Often the primary destination 221 may be a trace aggregator shared among all of the trace sources within the SoC. However, in some cases, a single path from a source to a trace aggregator, e.g., the primary destination 221, is not sufficient, especially in cases where additional bandwidth is desired. When many sources are added to a shared tracing network, e.g., the DTF 200, the limited tracing bandwidth becomes a point of contention.

When designing a shared tracing fabric for a SoC, one of the primary considerations is the amount of bandwidth available from any source to the trace aggregator, e.g., the primary destination 221, and to the eventual trace destination of the functional blocks in the SoC. When many sources are present, those sources all share the same bandwidth. In some designs, there may be tens, or hundreds, of sources that all want to use a large amount of bandwidth sharing a relatively small pipe, resulting in contentions on the shared trace aggregator.

In order to address these bandwidth concerns, the secondary destination 223 is added to the DTF 200 to remove or reduce bottlenecks. The multiple trace aggregators on the SoC level DTF, e.g., the primary destination 221 and the secondary destination 223 essentially "segment" the DTF and allow the total available bandwidth to scale up. As a result, "multiple trace destinations" or, more specifically, "multiple trace aggregators" are used, which become the secondary destinations, e.g., the secondary destination 223. With multiple trace aggregators as the secondary destinations, the trace system may be configured by the debug user to send individual trace messages from sources to the appropriate trace destinations. Because each trace destination has different properties and tradeoffs associated with its use, debug users may want a different configuration depending on the debug use case. Hence, the debug user may want to specify the configuration as part of the setup of the trace system to determine the routing of trace traffics. This allows different sources to target different trace aggregators, e.g., either the primary destination 211 or the secondary destination 223, thereby allowing a higher total bandwidth. Each source may still be limited in the maximum amount of bandwidth that it can use, but the total available bandwidth in the DTF 200 is greater than using only one primary destination. With placements of multiple "secondary destinations," the total amount of trace bandwidth can be increased significantly, perhaps by orders of magnitude.

In embodiments, the arbiter 211, the arbiter 213, and the upstream DTF tree 231, form a tree-based network, sometimes referred to as the backbone of the DTF 200. The arbiter 211 or the arbiter 213 takes one or more upstream inputs and produces one or more downstream outputs. For example, the arbiter 211 has an input port 207, and an input port 209. The arbiter 211 is to receive a message 243 through the input port 207 from a neighbor, e.g., the repeater 205. The message 243 includes a destination identifier 245 to identify an intended destination selected from the primary destination 221 or the secondary destination 223. In some embodiments, the destination identifier 245 includes only one bit having a binary value of 0 or 1, to indicate whether the intended destination is the primary destination 221 or the secondary destination 223.

The arbiter 213 has only one output, and may become one of the bottlenecks, where multiple sources are combined to a single output. On the other hand, the arbiter 211 has two output ports, an output port 206 and an output port 208. The output port 206 is coupled to a neighbor, e.g., the arbiter 213, which reaches the primary destination 221. Hence, the output port 206 is a primary output port. On the other hand, the output port 208 is coupled to a neighbor, which is the secondary destination 223. Hence, the output port 208 is a secondary output port. The secondary output port 208 may be in a state selected from a not connected state, a configuration state, a reset state, or a functional state. A nonfunctional state may include the not connected state, the configuration state, or the reset state.

In embodiments, the arbiter 211 may further include a control unit 215. The control unit 215 is arranged to select the secondary output port 208 to deliver the received message 243 when the intended destination of the message 243 is the secondary destination 223 and the secondary output port 208 is in a functional state. Alternatively, the control unit 215 is arranged to select the primary output port 206 to deliver the received message 243 to the primary destination 221 when the intended destination is the secondary destination 223 and the secondary output port that reaches the secondary destination, e.g., the secondary output port 208, is in a nonfunctional state. Furthermore, the control unit 215 is arranged to select the primary output port 206 to deliver the received message 243 to the primary destination 221 when the destination identifier indicates the intended destination to be the primary destination 221.

FIG. 2(b) illustrates further operations of the arbiter 211. The arbiter 211 has the input port 207 and the input port 209. The message 243 is a first message from the first neighbor, the repeater 205, with the secondary destination 223 as a first intended destination. The arbiter 211 is to receive a message 242 from a neighbor, e.g., the source 214, with the primary destination 221 as a second intended destination, as indicated by a destination identifier 244 of the message 242. The control unit 215 is arranged to select the primary output port 206 to deliver the message 242 to the primary destination 221, and to select the secondary output port 208 to deliver the message 243 in parallel with delivering the message 242.

As a result, FIG. 2(b) shows a mapping of the two sources to two different trace aggregators in two different paths, e.g., a path 233 from the source 212 to the secondary destination 223 for the message 243 to travel through, and a path 235 from the source 214 to the primary destination 221 for the message 242 to travel through. Each of the two sources has full bandwidth to the trace destination because of the placement of the DTF arbiter with two output ports.

In embodiments, the destination identifier 244 or the destination identifier 245 may be a single bit, named destid. This bit is produced by each source, and flows along with the data within the DTF 200 as part of the header information of the packets for the messages. To produce the destid bit, the source packetizer 201 or the source packetizer 203 includes a "Destination ID" bit in a user-programmable configuration register. The debug configuration tools will then program each source's destination ID with the debug user's desired configuration. Each source's default behavior is to route to the primary destination 221, e.g., to produce a destid of 0.

In embodiments, an arbiter may select the primary output port or a secondary output port depending on the value of the destid. The arbiter may not be aware of any other information from the source, nor the packet itself. There may be no inspection of the payload. As a result, an arbiter can determine the destination fast (e.g., a single AND gate comparison) based on the destid bit alone. In addition, there may not be any run-time programming of the arbiter needed for the routing of the messages. All information is known at run-time by the arbiter by simply looking at the destid bit, and the status of the secondary port reset signal.

The arbiter selects the "destination" using the destid bit based on these simple rules: (1) If the arbiter has only one output port, e.g., the primary output port, configured, which may be a compile-time parameter, all traffic is sent to that output port, regardless of the destid bit. The destid bit is not modified. (2) If the arbiter has both the primary and the secondary output ports configured, and the secondary trace output port is out of reset and in a functional state, all traffic with destid==1 is sent to the secondary port for the secondary destination. Otherwise, the traffic is sent to the primary output port for the primary destination. In both cases, the destid bit is not modified.

For a component in the DTF 200 that does not have multiple outputs, the destid bit may be treated as no impact or transparent without performing any operation. Hence, components amongst different products may be used in the DTF without affecting the use of the destid bit. In addition, if a source is configured to route to a secondary destination via programming, and there are no enabled secondary destinations, the data will still flow to the primary destination without affecting the desired functionality of the data.

Embodiments herein have many advantages compared to some current techniques for routing trace traffics in a DTF. As shown below, some of the current techniques each has its own disadvantages when used in a distributed tracing system, e.g., the DTF 200.

Trace aggregator destination filtering/steering is technique for routing trace traffics in a DTF. In this technique, individual trace sources are steered to a destination by some type of filtering logic that is programmed by the debug tools (i.e., the debug user). In detail, the user specifies some type of criteria that identifies the source (e.g., a "master ID"), and hardware implements "filters" to route the particular source to a particular destination. In a distributed trace system, the filtering described must be placed at every arbitration point within the network. When the DTF is implemented as a tree, there may be tens, if not hundreds, of arbiters throughout the network. In addition, the filtering logic can be extremely large. For example, in the DTF example, the filtering would need to be completed on the 8 bit "master ID" and 8 bit "channel ID" fields, for a total of 16 bit (and up to 65k potential sources, though all products have a very sparse use of that space). Furthermore, the debug user may desire any (one or more than one) of those 65k potential unique sources to go to different destinations. Having a filtering space with 65k potential combinations is impractical, so multiple "copies" of filtering logic, likely with some type of "mask and match" functionality to detect ranges of master or channel IDs, is used. Even though this type of filtering may be effective in certain situations, e.g., when used within a trace aggregator itself, the filtering is impractical to implement in a distributed DTF, e.g., the DTF 200.

Alternatively, trace bus repeaters may be used in a DTF. In this technique, the trace fabric is duplicated to multiple destinations, and each of the destinations is either enabled or disabled. While not directly used for different "routing", a more advanced "trace sink" could be developed that implemented filtering to include a "subset" of the trace. In this case, there would be two instances of the "trace sink" with filtering, and the debug user would program the two "trace sinks" differently—essentially one sink would be programmed as the inverse of the other sink. In this method, similar filter logic as described in trace aggregator destination filtering is implemented in each trace sink. This logic is not applied at each arbitration point, but rather at each repeater. In addition, the two trace sinks need to operate in parallel with one another and be able to sink the incoming trace data at the same rate.

Additionally, destination ID programming is a general purpose fabric used to transport trace from a source to a destination. The fabric includes routers, and each "message" on the fabric contains a "destination ID" field. Each router has a fixed routing table (specified at design time) to understand the overall topology of the fabric. The destination ID field is used to route the message to the correct endpoint. When using this for trace, different trace destinations are at different endpoints of the fabric. The debug user then programs the trace destination within the source, and the fabric handles the routing. In this case, there are two primary disadvantages. First, the network itself must be aware of the full SOC routing, either at compile time, or at run time. When programming is used, the debug tools need to be aware of the full topology. In addition, the number of bits that must be used is based on the total number of endpoints (which may include all sources and destinations.) Finally, because of the nature of the routing network, understanding how bandwidth is used and shared could be more complicated, as that requires more detailed knowledge of the overall topology.

Embodiments herein differ from those current techniques described above in many ways. The tracing source creating packets to be placed on to the fabric does not contain any type of fabric routing or lookup table implemented in hardware or programmed via software. Neither the source itself nor the debug tool software is aware of the topology of the DTF that the source is connected to. No bridge is required between the source and the DTF to provide fabric routing information. The fabric routing elements (e.g., arbiters) also do not contain any routing or lookup table. Each routing element in fabric itself is not aware of what is upstream or downstream of that element. Each routing element examines the single bit, combined with the availability of an alternate destination at that routing element, to determine the routing decision. The source is not aware of the number or availability of possible trace destinations. As a result, the source destination bit that is programmed by the debug user can be interpreted as a "preference" to go to the first alternate (e.g., secondary) destination when an alternate destination exists. Functional correctness is maintained if no alternate destinations are present and/or enabled.

In embodiments, for the DTF 200, a single-bit "destination ID," e.g., the de stid, is added to the package that is produced by each trace source and configurable by the debug user. The destination ID bit is used at each DTF arbitration point (where multiple inputs are combined to a single output) to choose one of multiple output paths. Hence, embodiments herein provide per-source level programming with a single bit carried through the DTF, without programming any of the fabric elements at any time (either at configuration time or at run time), and without knowledge of the fabric topology by the debug configuration tools. For example, there is no programming of arbiters with routing information. In addition, the capability is designed in such a way that if a secondary destination is not present or enabled, each packet will flow through to the trace aggregator at the root of the tree. The secondary destination support allows for multiple different use models that allow for scale up and scale down of internal tracing solutions. In addition, embodiments herein allow easy reuse, by adding elements earlier or later in the DTF 200, without changing any "programming" of the DTF 200. Moreover, embodiments herein allow for a dynamic configuration, and support for products that may not have a secondary trace solution available or enabled, with no changes to the source.

Figure 3:
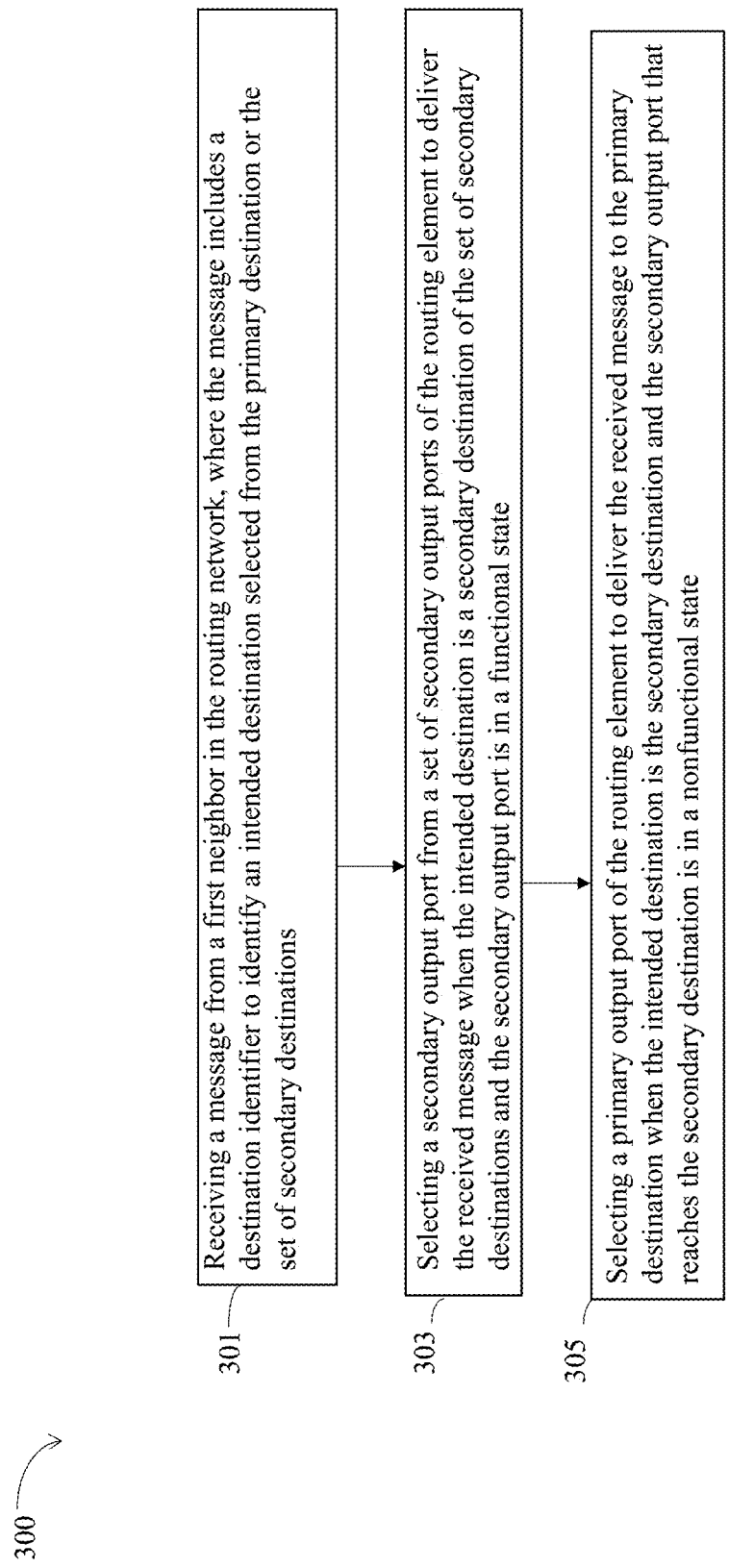
FIG. 3 schematically illustrates a process for routing traffics in a routing network having a set of routing elements, a set of sources, a primary destination, and a set of secondary destinations, according to various embodiments.

FIG. 3 schematically illustrates a process 300 for routing traffics in a routing network including a set of routing elements, a set of sources, a primary destination, and a set of secondary destinations, according to various embodiments. In embodiments, the process 300 may be performed by the arbiter 211 as shown in FIGS. 2(a)-2(b), or by the routing elements in the routing network 100 as shown in FIG. 1(a). For example, the routing network includes a set of sources, a primary destination, and a set of secondary destinations. A routing element includes a primary output port and a set of secondary output ports. The primary output port is arranged to be coupled to a neighbor that is the primary destination or a routing element that reaches the primary destination. A secondary output port is arranged to be coupled to a neighbor that is the secondary destination or a routing element that reaches one or more of the set of secondary destinations.

At a block 301, the process 300 may include receiving a message from a first neighbor in the routing network, where the message includes a destination identifier to identify an intended destination selected from the primary destination or the set of secondary destinations. For example, as shown in FIG. 2(b), at the block 301, the process 300 may include receiving the message 243 from the neighbor 205, where the message 243 includes the destination identifier 245 to identify the intended destination as the secondary destination 223.

At a block 303, the process 300 may include selecting a secondary output port from a set of secondary output ports of the routing element to deliver the received message when the intended destination is a secondary destination of the set of secondary destinations and the secondary output port is in a functional state. For example, as shown in FIG. 2(b), at the block 303, the process 300 may include selecting the secondary output port 208 to deliver the message 243 when the intended destination is the secondary destination 223 and the secondary output port 208 is in a functional state.

At a block 305, the process 300 may include selecting a primary output port of the routing element to deliver the received message to the primary destination when the intended destination is the secondary destination and the secondary output port that reaches the secondary destination is in a nonfunctional state. For example, as shown in FIG. 2(b), at the block 305, the process 300 may include selecting the primary output port 206 to deliver the message 243 to the primary destination 221 when the intended destination is the secondary destination 223 and the secondary output port 208 that reaches the secondary destination 223 is in a nonfunctional state.

Process 300 may further include other operations performed, e.g., selecting the primary output port to deliver the received message to the primary destination when the intended destination of the message is the primary destination. Furthermore, the message is a first message received by the routing element through a first input port from a first neighbor with the secondary destination as a first intended destination, and the method further includes receiving a second message through a second input port from another neighbor with the primary destination as a second intended destination, and selecting the secondary output port to deliver the first received message to the secondary destination, and selecting the primary output port to deliver the second received message in parallel with delivering the first message.

Figure 4:
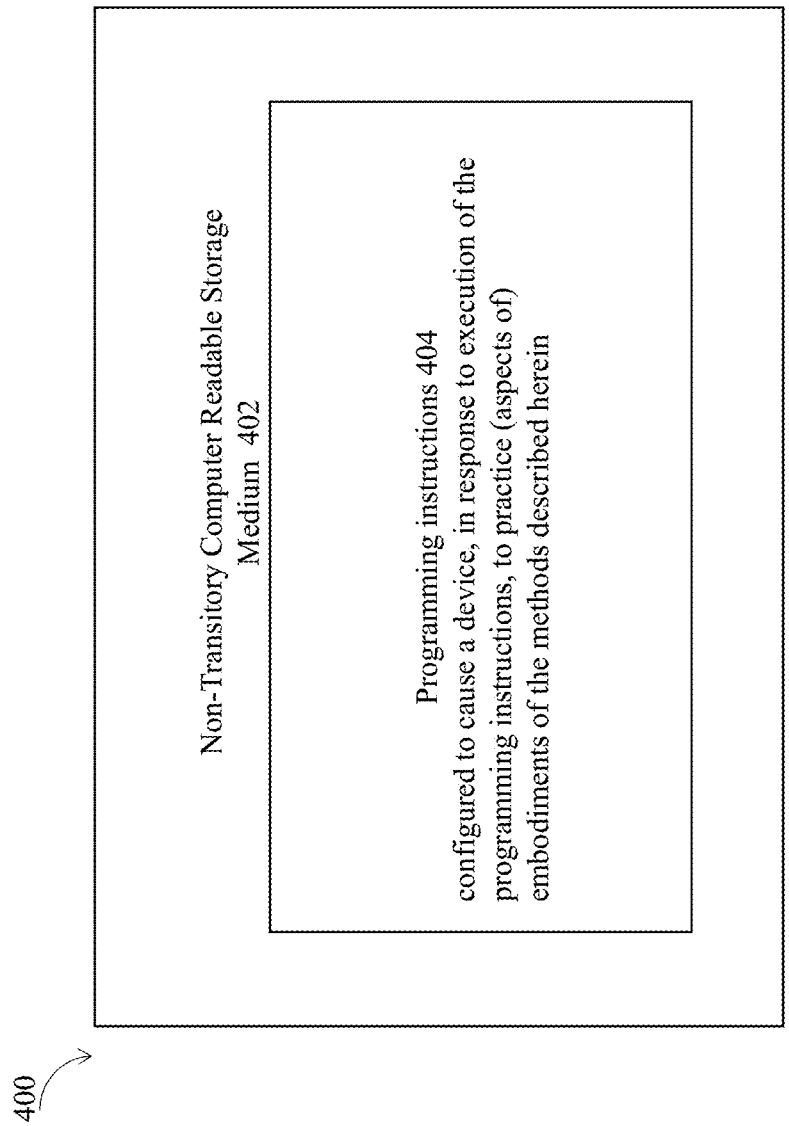
FIG. 4 illustrates a storage medium having instructions for practicing methods described with references to FIGS. 1(a)-1(c), 2(a)-2(b) and 3, in accordance with various embodiments.

Furthermore, the present disclosure may take the form of a computer program product embodied in any tangible or non-transitory medium of expression having computer-usable program code embodied in the medium. FIG. 4 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 402 may include a number of programming instructions 404. Programming instructions 404 may be configured to enable a device, in response to execution of the programming instructions, to perform, e.g., various operations associated with the process 300 for routing traffics in a routing network including a set of routing elements, a set of sources, a primary destination, and a set of secondary destinations, according to various embodiments. The various operations may be performed by the arbiter 211 as shown in FIGS. 2(a)-2(b), or by the routing elements in the routing network 100 as shown in FIG. 1(a).

In alternate embodiments, programming instructions 404 may be disposed on multiple computer-readable non-transitory storage media 402 instead. In alternate embodiments, programming instructions 404 may be disposed on computer-readable transitory storage media 402, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

EXAMPLES

Example 1 may include a device to act as a first of a plurality of routing elements in a routing network, comprising: an input port, wherein the input port is arranged to receive a message from a first neighbor in the routing network, wherein the routing network further includes a set of sources, a primary destination, and a set of secondary destinations, and the message includes a destination identifier to identify an intended destination selected from the primary destination or the set of secondary destinations; a set of output ports including a primary output port and a set of secondary output ports, wherein the primary output port is arranged to be coupled to a second neighbor that is the primary destination or a routing element that reaches the primary destination, and a secondary output port is arranged to be coupled to a third neighbor that is one of the secondary destinations or a routing element that reaches one or more of the set of secondary destinations; and a control unit, wherein the control unit is arranged to select a secondary output port of the set of output ports to deliver the received message when the intended destination of the message is a secondary destination of the set of secondary destinations and the secondary output port is in a functional state, or select the primary output port to deliver the received message to the primary destination when the intended destination is the secondary destination and the secondary output port that reaches the secondary destination is in a nonfunctional state.

Example 2 may include the device of example 1 and/or some other examples herein, wherein the control unit is further to select the primary output port to deliver the received message to the primary destination when the destination identifier indicates the intended destination to be the primary destination.

Example 3 may include the device of example 1 and/or some other examples herein, wherein the set of sources and the primary destination together with one or more routing elements of the set of routing elements form a tree, and the secondary destination is coupled to the tree through one or more of the routing elements.

Example 4 may include the device of example 1 and/or some other examples herein, wherein the routing network includes only one secondary destination, and the destination identifier includes only one bit having a binary value of 0 or 1.

Example 5 may include the device of example 1 and/or some other examples herein, wherein the secondary output port is in a state selected from a not connected state, a configuration state, a reset state, or a functional state, and wherein the nonfunctional state includes the not connected state, the configuration state, or the reset state.

Example 6 may include the device of example 1 and/or some other examples herein, wherein the control unit is arranged to select the secondary output port or the primary output to deliver the received message based on the destination identifier without information about a topology of the routing network.

Example 7 may include the device of example 1 and/or some other examples herein, wherein the input port is a first input port, and the message is a first message from the first neighbor with the secondary destination as a first intended destination, and the device further includes a second input port arranged to receive a second message from a fourth neighbor with the primary destination as a second intended destination, and wherein the control unit is arranged to select the primary output port to deliver the second received message to the primary destination, and to select the secondary output port to deliver the first received message in parallel with delivering the second message.

Example 8 may include the device of example 1 and/or some other examples herein, wherein the set of output ports of the device is a first set of output ports, and the plurality of routing elements includes a second routing element with a second set of output ports, and wherein a first size of the first set of output ports of the first routing element differs from a second size of the second set of output ports of the second routing element.

Example 9 may include the device of example 1 and/or some other examples herein, the routing network is a part of a debug trace fabric (DTF) for a computing system, and the routing elements are arbiters.

Example 10 may include the device of example 9 and/or some other examples herein, wherein the DTF is for a system-on-chip (SoC) including multiple functional blocks, a source of the set of sources is selected from the multiple functional blocks of the SOC, and the SOC further includes a functional communication network coupling the multiple functional blocks.

Example 11 may include the device of example 10 and/or some other examples herein, wherein the functional communication network is a star network coupling the multiple functional blocks.

Example 12 may include the device of example 10 and/or some other examples herein, wherein a functional block of the multiple functional blocks for the SoC is selected from a processor, a memory, an input/output block, a secondary storage, an analog functional block, or a mixed-signal functional block.

Example 13 may include the device of example 10 and/or some other examples herein, wherein the primary destination includes a buffer coupled to all functional blocks of the SoC.

Example 14 may include a debug trace fabric (DTF) for a system-on-chip (SoC) of a computer system, comprising: a set of sources, wherein the system-on-chip (SoC) includes multiple functional blocks, the set of sources are selected from the multiple functional blocks; a primary destination coupled to one or more of the multiple functional blocks; a set of secondary destinations coupled to one or more of the multiple functional blocks; and one or more arbiters, wherein an arbiter of the one or more arbiters includes: an input port, wherein the input port is arranged to receive a message from a first neighbor in the DTF, and the message includes a destination identifier to identify an intended destination selected from the primary destination or the set of secondary destinations; a set of output ports including a primary output port and a set of secondary output ports, wherein the primary output port is coupled to a second neighbor, the second neighbor is either the primary destination or an arbiter that reaches the primary destination, and wherein a secondary output port is coupled to a third neighbor, the third neighbor is a secondary destination or an arbiter that reaches the secondary destination; and a control unit, wherein the control unit is arranged to select a secondary output port of the set of output ports to deliver the received message when the intended destination of the message is the secondary destination and the secondary output port is in a functional state, or select the primary output port to deliver the received message to the primary destination when the intended destination is the secondary destination and the secondary output port that reaches the secondary destination is in a nonfunctional state.

Example 15 may include the DTF of example 14 and/or some other examples herein, wherein the control unit is further to select the primary output port to deliver the received message to the primary destination when the destination identifier indicates the intended destination to be the primary destination.

Example 16 may include the DTF of example 14 and/or some other examples herein, wherein the set of sources and the primary destination together with the one or more arbiters form a tree, and the secondary destination is coupled to the tree through at least an arbiter.

Example 17 may include the DTF of example 14 and/or some other examples herein, wherein the SOC further includes a functional communication network coupling the multiple functional blocks, and the functional communication network is a star network.

Example 18 may include the DTF of example 14 and/or some other examples herein, wherein the set of secondary destinations includes only one secondary destination, and the destination identifier includes only one bit having a binary value of 0 or 1.

Example 19 may include the DTF of example 14 and/or some other examples herein, wherein the secondary output port is in a state selected from a not connected state, a configuration state, a reset state, or a functional state, and wherein a nonfunctional state includes the not connected state, the configuration state, or the reset state.

Example 20 may include the DTF of example 14 and/or some other examples herein, wherein the input port is a first input port, and the message is a first message from the first neighbor with the secondary destination as a first intended destination, and the arbiter further includes a second input port arranged to receive a second message from a fourth neighbor with the primary destination as a second intended destination, and wherein the control unit is arranged to select the secondary output port to deliver the first received message to the secondary destination, and to select the primary output port to deliver the second received message in parallel with delivering the first message.

Example 21 may include a method for a routing element in a routing network, comprising: receiving a message from a first neighbor in the routing network, wherein the routing network further includes a set of sources, a primary destination, and a set of secondary destinations, and the message includes a destination identifier to identify an intended destination selected from the primary destination or the set of secondary destinations; selecting a secondary output port from a set of secondary output ports of the routing element to deliver the received message when the intended destination is a secondary destination of the set of secondary destinations and the secondary output port is in a functional state, or selecting a primary output port of the routing element to deliver the received message to the primary destination when the intended destination is the secondary destination and the secondary output port that reaches the secondary destination is in a nonfunctional state, wherein the routing element includes the primary output port and the set of secondary output ports, the primary output port is arranged to be coupled to a second neighbor that is the primary destination or a routing element that reaches the primary destination, and the secondary output port is arranged to be coupled to a third neighbor that is the secondary destination or a routing element that reaches one or more of the set of secondary destinations.

Example 22 may include the method of example 21 and/or some other examples herein, further comprising: selecting the primary output port to deliver the received message to the primary destination when the intended destination of the message is the primary destination.

Example 23 may include the method of example 21 and/or some other examples herein, wherein the routing network includes only one secondary destination, and the destination identifier includes only one bit having a binary value of 0 or 1.

Example 24 may include the method of example 21 and/or some other examples herein, wherein the secondary output port is in a state selected from a not connected state, a configuration state, a reset state, or a functional state, and wherein a nonfunctional state includes the not connected state, the configuration state, or the reset state.

Example 25 may include the method of example 21 and/or some other examples herein, wherein the message is a first message through a first input port from the first neighbor with the secondary destination as a first intended destination, and the method further includes: receiving a second message through a second input port from a fourth neighbor with the primary destination as a second intended destination, and selecting the secondary output port to deliver the first received message to the secondary destination, and selecting the primary output port to deliver the second received message in parallel with delivering the first message.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

These modifications may be made to the disclosure in light of the above detailed description. The terms used in the following claims should not be construed to limit the disclosure to the specific implementation disclosed in the specification and the claims. Rather, the scope of the disclosure is to be determined entirely by the following claims, which are to be construed in accordance with established doctrines of claim interpretation.

What is claimed is:

1. A device to act as a first of a plurality of routing elements in a routing network, comprising:
an input port, wherein the input port is arranged to receive a message from a first neighbor in the routing network, wherein the routing network further includes a set of sources, a primary destination, and a set of secondary destinations, and the message includes a destination identifier to identify an intended destination selected from the primary destination or the set of secondary destinations;
a set of output ports including a primary output port and a set of secondary output ports, wherein the primary output port is arranged to be coupled to a second neighbor that is the primary destination or a routing element that reaches the primary destination, and a secondary output port is arranged to be coupled to a third neighbor that is one of the secondary destinations or a routing element that reaches one or more of the set of secondary destinations; and
circuitry configured to:
select a secondary output port of the set of output ports to deliver the received message when the intended destination of the message is a secondary destination of the set of secondary destinations and the secondary output port is in a functional state, or
select the primary output port to deliver the received message to the primary destination when the intended destination is the secondary destination and the secondary output port that reaches the secondary destination is in a nonfunctional state;
wherein the routing network includes only one secondary destination, and the destination identifier includes only one bit having a binary value of 0 or 1.

2. The device of claim 1, wherein the circuitry is further to select the primary output port to deliver the received message to the primary destination when the destination identifier indicates the intended destination to be the primary destination.

3. The device of claim 1, wherein the set of sources and the primary destination together with one or more routing elements of the set of routing elements form a tree, and the secondary destination is coupled to the tree through one or more of the routing elements.

4. The device of claim 1, wherein the secondary output port is in a state selected from a not connected state, a configuration state, a reset state, or a functional state, and wherein the nonfunctional state includes the not connected state, the configuration state, or the reset state.

5. The device of claim 1, wherein the circuitry is arranged to select the secondary output port or the primary output to deliver the received message based on the destination identifier without information about a topology of the routing network.

6. The device of claim 1, wherein the input port is a first input port, and the message is a first message from the first neighbor with the secondary destination as a first intended destination, and the device further includes a second input port arranged to receive a second message from a fourth neighbor with the primary destination as a second intended destination, and
wherein the circuitry is arranged to select the primary output port to deliver the second received message to the primary destination, and to select the secondary output port to deliver the first received message in parallel with delivering the second message.

7. The device of claim 1, wherein the set of output ports of the device is a first set of output ports, and the plurality of routing elements includes a second routing element with a second set of output ports, and wherein a first size of the first set of output ports of the first routing element differs from a second size of the second set of output ports of the second routing element.

8. The device of claim 1, the routing network is a part of a debug trace fabric (DTF) for a computing system, and the routing elements are arbiters.

9. The device of claim 8, wherein the DTF is for a system-on-chip (SoC) including multiple functional blocks, a source of the set of sources is selected from the multiple functional blocks of the SOC, and the SOC further includes a functional communication network coupling the multiple functional blocks.

10. The device of claim 9, wherein the functional communication network is a star network coupling the multiple functional blocks.

11. The device of claim 9, wherein a functional block of the multiple functional blocks for the SoC is selected from a processor, a memory, an input/output block, a secondary storage, an analog functional block, or a mixed-signal functional block.

12. The device of claim 9, wherein the primary destination includes a buffer coupled to all functional blocks of the SoC.

13. A debug trace fabric (DTF) for a system-on-chip (SoC) of a computer system, comprising:
   a set of sources, wherein the system-on-chip (SoC) includes multiple functional blocks, the set of sources are selected from the multiple functional blocks;
   a primary destination coupled to one or more of the multiple functional blocks;
   a set of secondary destinations coupled to one or more of the multiple functional blocks; and
   one or more arbiters, wherein an arbiter of the one or more arbiters includes:
      an input port, wherein the input port is arranged to receive a message from a first neighbor in the DTF, and the message includes a destination identifier to identify an intended destination selected from the primary destination or the set of secondary destinations;
      a set of output ports including a primary output port and a set of secondary output ports, wherein the primary output port is coupled to a second neighbor, the second neighbor is either the primary destination or an arbiter that reaches the primary destination, and wherein a secondary output port is coupled to a third neighbor, the third neighbor is either a secondary destination or an arbiter that reaches the secondary destination; and
      circuitry configured to select a secondary output port of the set of output ports to deliver the received message when the intended destination of the message is the secondary destination and the secondary output port is in a functional state, or select the primary output port to deliver the received message to the primary destination when the intended destination is the secondary destination and the secondary output port that reaches the secondary destination is in a nonfunctional state;
      wherein the input port is a first input port, and the message is a first message from the first neighbor with the secondary destination as a first intended destination, and the arbiter further includes a second input port arranged to receive a second message from a fourth neighbor with the primary destination as a second intended destination, and
      wherein the circuitry is arranged to select the secondary output port to deliver the first received message to the secondary destination, and to select the primary output port to deliver the second received message in parallel with delivering the first message.

14. The DTF of claim 13, wherein the circuitry is further to select the primary output port to deliver the received message to the primary destination when the destination identifier indicates the intended destination to be the primary destination.

15. The DTF of claim 13, wherein the set of sources and the primary destination together with the one or more arbiters form a tree, and the secondary destination is coupled to the tree through at least an arbiter.

16. The DTF of claim 13, wherein the SOC further includes a functional communication network coupling the multiple functional blocks, and the functional communication network is a star network.

17. The DTF of claim 13, wherein the set of secondary destinations includes only one secondary destination, and the destination identifier includes only one bit having a binary value of 0 or 1.

18. The DTF of claim 13, wherein the secondary output port is in a state selected from a not connected state, a configuration state, a reset state, or a functional state, and wherein a nonfunctional state includes the not connected state, the configuration state, or the reset state.

19. A method for a routing element in a routing network, comprising:
   receiving a message from a first neighbor in the routing network, wherein the routing network further includes a set of sources, a primary destination, and a set of secondary destinations, and the message includes a destination identifier to identify an intended destination selected from the primary destination or the set of secondary destinations;
   selecting a secondary output port from a set of secondary output ports of the routing element to deliver the received message when the intended destination is a secondary destination of the set of secondary destinations and the secondary output port is in a functional state, or
   selecting a primary output port of the routing element to deliver the received message to the primary destination when the intended destination is the secondary destination and the secondary output port that reaches the secondary destination is in a nonfunctional state,
   wherein the routing element includes the primary output port and the set of secondary output ports, the primary output port is arranged to be coupled to a second neighbor that is the primary destination or a routing element that reaches the primary destination, and the secondary output port is arranged to be coupled to a third neighbor that is the secondary destination or a routing element that reaches one or more of the set of secondary destinations;
   wherein the routing network includes only one secondary destination, and the destination identifier includes only one bit having a binary value of 0 or 1.

20. The method of claim 19, further comprising:
   selecting the primary output port to deliver the received message to the primary destination when the intended destination of the message is the primary destination.

21. The method of claim 19, wherein the secondary output port is in a state selected from a not connected state, a configuration state, a reset state, or a functional state, and wherein a nonfunctional state includes the not connected state, the configuration state, or the reset state.

22. The method of claim 19, wherein the message is a first message through a first input port from the first neighbor with the secondary destination as a first intended destination, and the method further includes:
   receiving a second message through a second input port from a fourth neighbor with the primary destination as a second intended destination, and
   selecting the secondary output port to deliver the first received message to the secondary destination, and selecting the primary output port to deliver the second received message in parallel with delivering the first message.

\* \* \* \* \*

UNITED STATES PATENT AND TRADEMARK OFFICE
CERTIFICATE OF CORRECTION

| | | |
|---|---|---|
| PATENT NO. | : 12,034,649 B2 | Page 1 of 1 |
| APPLICATION NO. | : 16/876902 | |
| DATED | : July 9, 2024 | |
| INVENTOR(S) | : Kevin Safford and Victor Ruybalid | |

It is certified that error appears in the above-identified patent and that said Letters Patent is hereby corrected as shown below:

In the Claims

Column 20
Line 35 "…from a not connected state…" should read --…from a not-connected state…--
Line 37 "…includes the not connected" should read --…includes the not-connected--
Line 63 "… 1, the routing…" should read --… 1, wherein the routing…--

Column 21
Line 2 "…of the SOC, and the SOC…" should read --… of the SoC, and the SoC…--
Line 17 "…wherein the system-on-chip (SoC)…" should read --…wherein the SoC…--

Column 22
Line 5 "…wherein the SOC further…" should read --… wherein the SoC further…--
Line 14 "…not connected state…" should read --… not-connected state…--
Line 16 "… the not connected…" should read --… the not-connected…--
Line 55 "…a not connected state…" should read --… a not-connected state…--
Line 57 "… the not connected…" should read --… the not-connected…--

Signed and Sealed this
Eighteenth Day of February, 2025

Coke Morgan Stewart
*Acting Director of the United States Patent and Trademark Office*